(12) United States Patent
Kang (10) Patent No.: US 7,370,869 B2
(45) Date of Patent: May 13, 2008

(54) SUSPENSION AND INSULATOR OF THE SAME

(75) Inventor: Je Young Kang, Kyunggi-do (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 350 days.

(21) Appl. No.: 10/918,623

(22) Filed: Aug. 16, 2004

(65) Prior Publication Data

US 2006/0017248 A1   Jan. 26, 2006

(30) Foreign Application Priority Data

Jul. 22, 2004   (KR)   ............ 10-2004-0057090

(51) Int. Cl.
 *B62D 17/00*  (2006.01)
 *B60G 7/02*  (2006.01)
(52) U.S. Cl. ............ 280/86.754; 280/86.751; 280/124.147; 280/124.155
(58) Field of Classification Search ............ 280/86.75, 280/86.751, 86.752, 124.147, 124.155, 86.754
See application file for complete search history.

(56) References Cited

U.S. PATENT DOCUMENTS 4,213,631 A * 7/1980 Wilkerson ............ 280/86.752
4,817,984 A * 4/1989 Ferman et al. ......... 280/86.752
5,484,161 A * 1/1996 McIntyre ............. 280/124.155
6,382,645 B1 * 5/2002 Gravelle et al. ....... 280/86.754
6,796,569 B2 * 9/2004 Pankau ................ 280/124.155

OTHER PUBLICATIONS

U.S. Appl. No. 10/720,228 to Jung, which was filed on Nov. 25, 2003.

* cited by examiner

*Primary Examiner*—Eric Culbreth
*Assistant Examiner*—Barry Gooden, Jr.
(74) *Attorney, Agent, or Firm*—Greenblum & Bernstein, P.L.C.

(57) ABSTRACT

Disclosed herein are a suspension and an insulator of the same. A plurality of car body points are uniformly spaced apart from each other on an imaginary circle formed by the car body points, and a strut point is eccentric from the center of the circle formed by the car body points. As the insulator is rotated about the center of the imaginary circle, relative positions of the strut point from the center of the imaginary circle are adjusted in the front and rear direction of a car body. Consequently, a caster angle is easily changed. Also, the caster angle is adjusted according to kinds of vehicles or depending on whether a power steering system is included or not without changing the structure of the suspension.

12 Claims, 7 Drawing Sheets

SUSPENSION AND INSULATOR OF THE SAME

BACKGROUND OF THE INVENTION

1. Field of the Invention

The present invention relates to a suspension that is capable of preventing vibration or shock generated from a road surface from being directly transmitted to a car body, thereby improving ride comport, and more particularly to a suspension that allows adjustment of a forward/backward tilt angle of a strut from a line perpendicular to a road surface, whereby a caster angle is easily changed. Also, the present invention relates to an insulator of the same.

2. Description of the Related Art

FIGS. 1 to 4 show a front wheel suspension and its insulator.

The suspension as shown in FIGS. 1 to 4 comprises: a strut 10 integrally attached to a steering knuckle 4, which is a center of a front wheel 2, by means of a king pin 6 while being disposed in parallel with a center line 7 of the king pin 6; an insulator 12 connected to the strut 10 and attached to a car body by means of bolts 11 for absorbing vibration or shock transmitted from the front wheel 2; a suspension spring 14 disposed on the outer circumference of the upper part of the strut 10 for relieving shock transmitted from a road surface; and a shock absorber 16 mounted to the strut 10 for restraining free vibration of the suspension spring 14 to improve ride comfort.

The strut 10 is moved forward and backward or right and left along with the steering knuckle 4 about the king pin 6, by which four factors for aligning the front wheel 2, such as a camber angle, toe-in, a caster angle $\theta$, and a king pin tilt angle, are determined.

Figure 1:
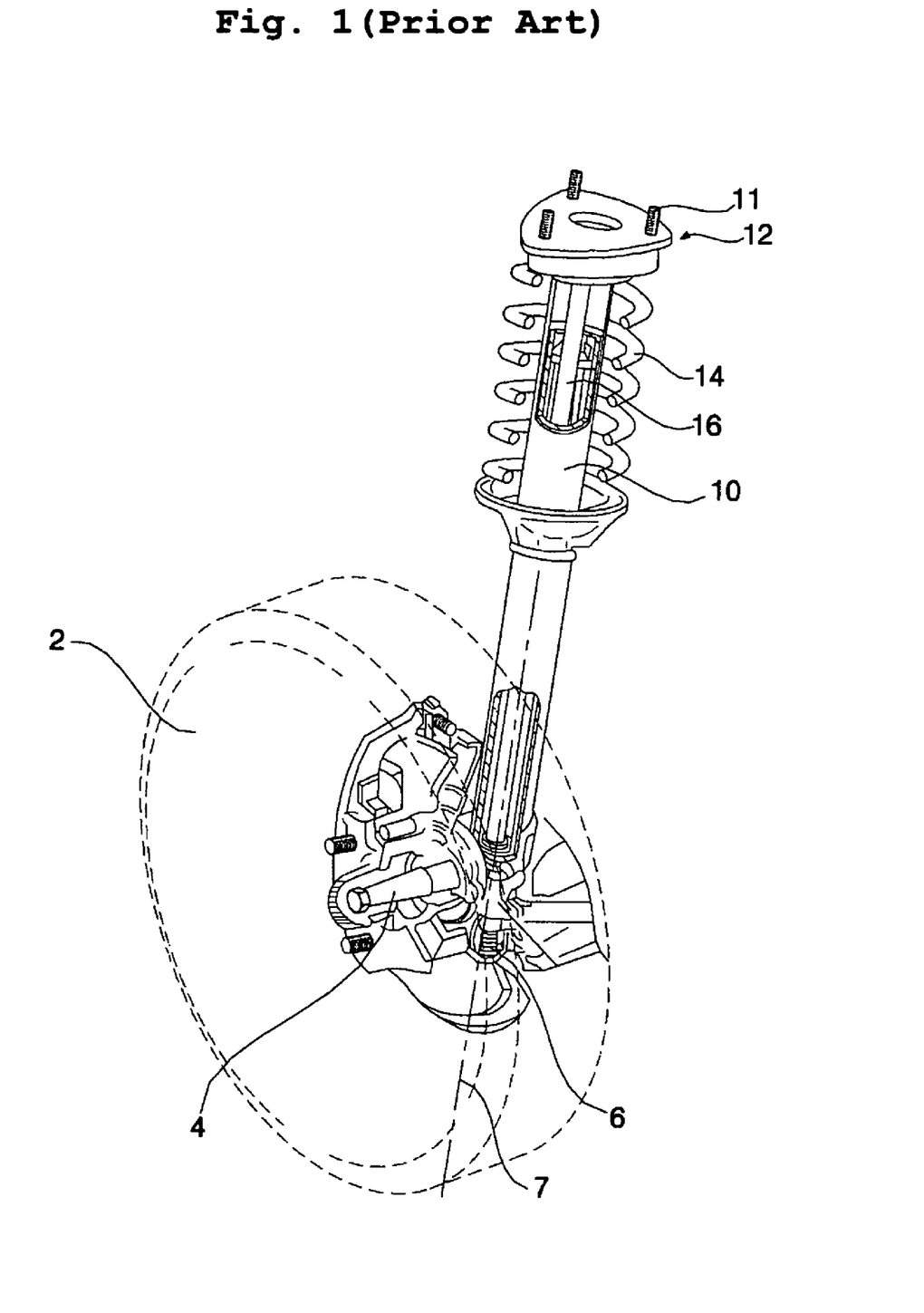
FIG. 1 is a perspective view showing a conventional suspension and its insulator.
Figure 2:
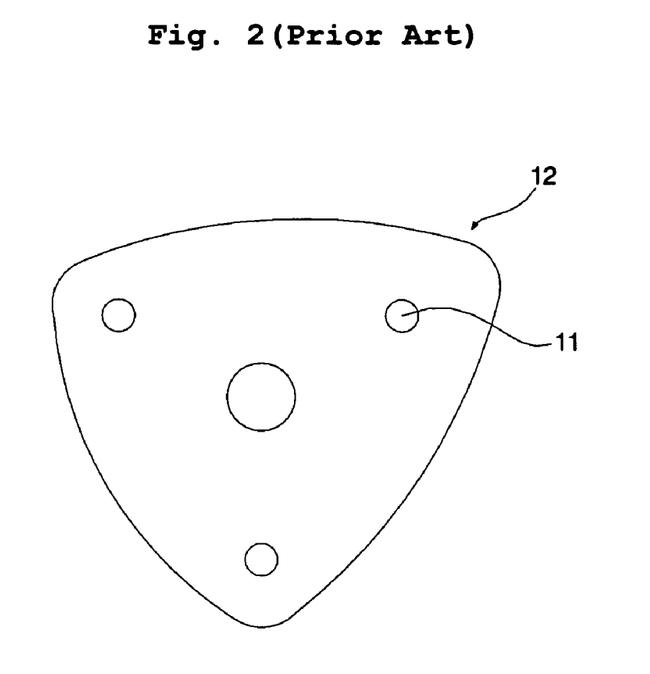
FIG. 2 is a plan view of the conventional insulator shown in FIG. 1.
Figure 3:
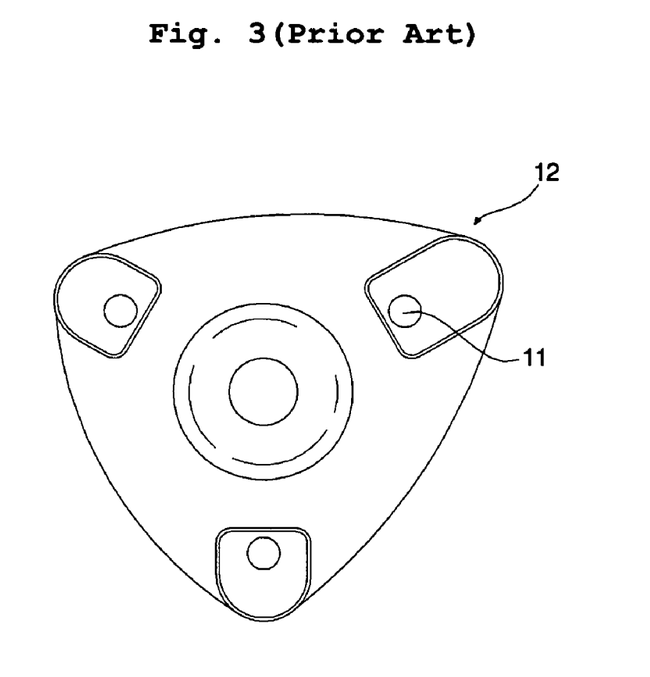
FIG. 3 is a rear view of the conventional insulator shown in FIG. 1.
Figure 4:
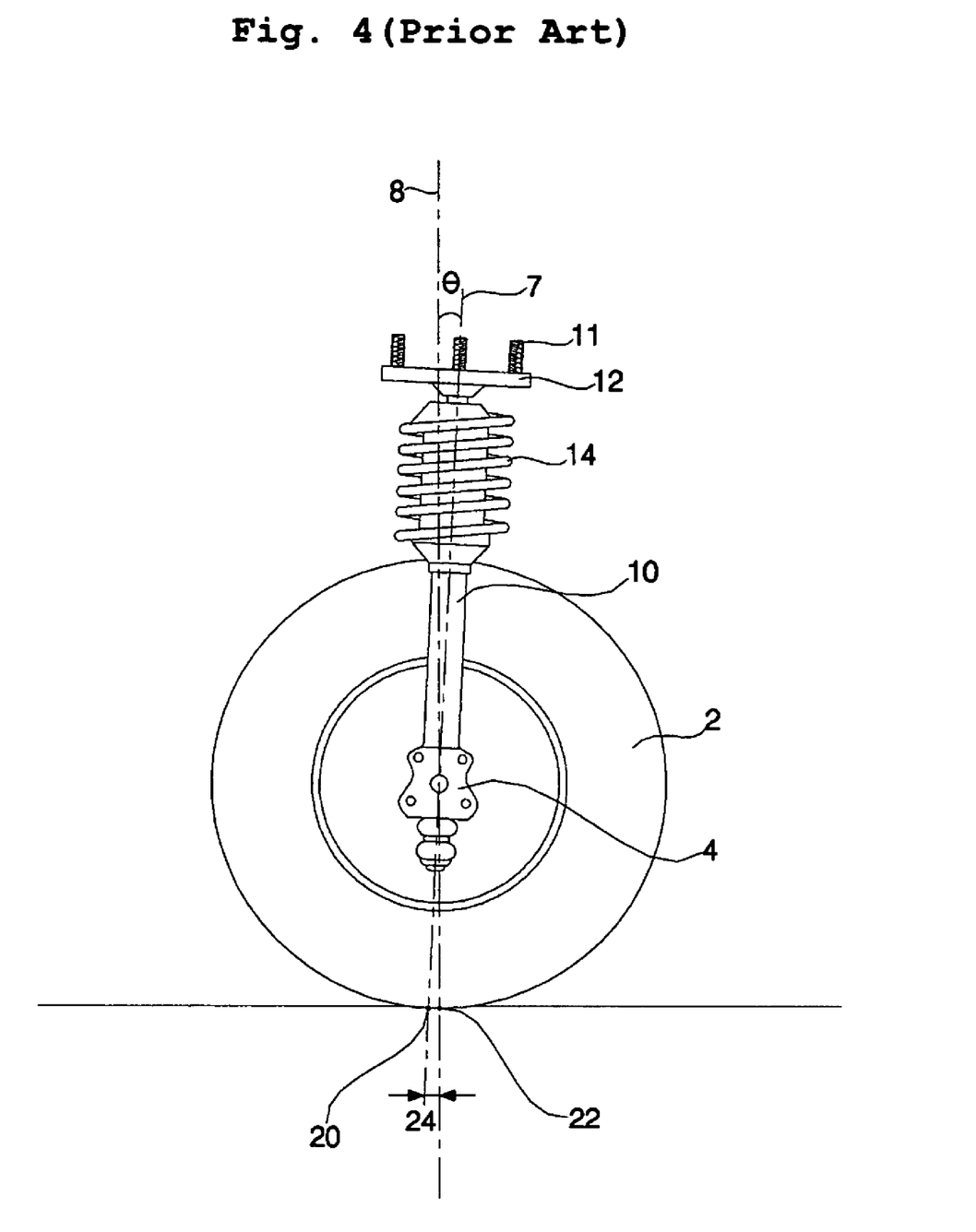
FIG. 4 is a view illustrating the operation of the conventional suspension and its insulator shown in FIG. 1.

Referring to FIG. 4, the caster angle $\theta$ is an angle between the center line 7 of the king pin 6 and a vertical line 8 perpendicular to the road surface when the front wheel 2 is seen from the side. In other words, the caster angle $\theta$ is a forward/backward tilt angle of the strut 10 from the vertical line 8 perpendicular to the road surface.

As the caster angle $\theta$ is increased, the distance between a caster point 20 where the extension of the center line 7 of the king pin 6 crosses the road surface and the center 22 of the road surface where the front wheel 2 contacts is also increased. As a result, a restoring force for guiding the front wheel 2 in the traveling direction of a vehicle is increased. However, the steering operation is very difficult.

The positions where the struts are assembled are different according to kinds of vehicles since required optimal caster angles are different according to kinds of vehicles, and required optimal caster angles are different depending on whether a power steering system to increase the steering forces of drivers of the vehicles is included or not although the kinds of vehicles are the same. Consequently, the conventional suspension and its insulator have low compatibility with the result that the suspension and its insulator suitable for one kind of vehicle are not adequately adopted in other kinds of vehicles. Although the conventional suspension and its insulator is adopted in the same kind of vehicles, it may be difficult to obtain an optimal caster angle depending on whether an optional accessory, such as a power steering system, is included or not.

Furthermore, it is difficult to change the caster angle once the caster angle is initially determined in any kind of vehicle.

SUMMARY OF THE INVENTION

Therefore, the present invention has been made in view of the above problems, and it is an object of the present invention to provide a suspension that allows adjustment of a caster angle according to kinds of vehicles or depending on whether a power steering system is included or not without changing the structure of the suspension.

It is another object of the present invention to provided an insulator of a suspension that allows adjustment of a caster angle according to kinds of vehicles or depending on whether a power steering system is included or not without changing the structure of the suspension.

In accordance with one aspect of the present invention, the above and other objects can be accomplished by the provision of an insulator of a suspension, comprising: a strut point connected to a strut, wherein the strut point is eccentric from the center of a circle formed by a plurality of car body points connected to a car body such that the strut point can be moved from the center of the circle formed by the car body points in the front and rear direction of the car body when the insulator is rotated about the center of the circle formed by the car body points.

Preferably, the strut point is positioned in the inside of the circle formed by the car body points.

Preferably, the car body points are uniformly spaced apart from each other on the circle formed by the car body points.

Preferably, the number of the car body points is three so that the car body points are spaced apart from each other by 120 degrees.

In accordance with another aspect of the present invention, there is provided a suspension comprising: a strut disposed between a car body and a steering knuckle such that the strut can be tilted forward or backward from a vertical line perpendicular to a road surface to obtain a caster angle; and an insulator connected to the strut by means of a strut point and connected to the car body by means of a plurality of car body points, wherein the strut point is eccentric from the center of a circle formed by the car body points such that the strut point can be moved from the center of the circle formed by the car body points in the front and rear direction of the car body when the insulator is rotated about the center of the circle formed by the car body points.

Preferably, the strut point is positioned in the inside of the circle formed by the car body points.

Preferably, the car body points are uniformly spaced apart from each other on the circle formed by the car body points.

Preferably, the number of the car body points is three so that the car body points are spaced apart from each other by 120 degrees.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be described in detail with reference to the accompanying drawings.

Various embodiments of a suspension and an insulator of the same according to the present invention may be disclosed, although only a most preferred embodiment will be described hereinafter. The basic structure of the suspension is identical to that of the conventional suspension as described above. Therefore, a detailed description of the basic structure of the suspension will not be given.

FIGS. 5 to 9 show a suspension and its insulator according to a preferred embodiment of the present invention.

The suspension as shown in FIGS. 5 to 9 comprises: a strut 60 attached to a steering knuckle 50, which is a center of a front wheel 51, by means of a king pin 52; a suspension spring 62 disposed on the outer circumference of the upper part of the strut 60 for relieving shock transmitted from a road surface; a shock absorber 64 mounted to the strut 60 for restraining free vibration of the suspension spring 62 to improve ride comfort; and an insulator 70 connected between the strut 60 and a car body.

Figure 5:
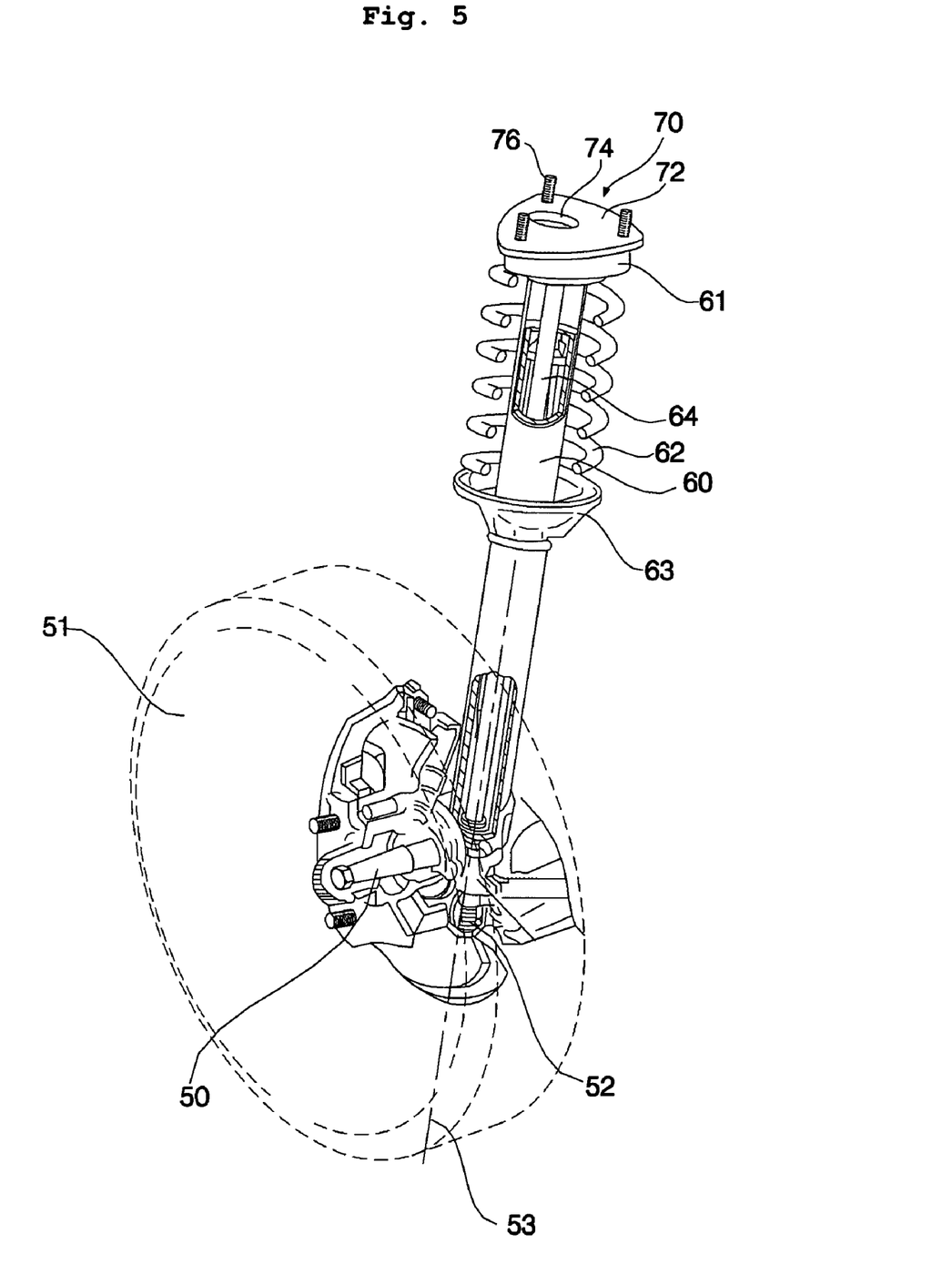
FIG. 5 is a perspective view showing a suspension and an insulator of the same according to a preferred embodiment of the present invention.

The strut 60 is disposed in parallel with a center line 53 of the king pin 52. Also, the strut 60 is disposed such that the strut 60 can be tilted, along with the king pin 52, predetermined degrees forward or backward, i.e., in the direction indicated by arrow A, from a vertical line 55 perpendicular to a road surface to obtain an angle between the center line 53 of the king pin 52 and the vertical line 55 perpendicular to the road surface, i.e., a caster angle λ.

The suspension spring 62 is securely disposed on the outer circumference of the strut 60 between upper and lower spring seats 61 and 63. The upper and lower spring seats 61 and 63 are spaced apart from each other in the direction of the center line 53 of the strut 60.

The insulator 70 is disposed on the upper spring seat 61.

The insulator 70 comprises: a case 72 attached to the strut 60 and the car body while being disposed between the strut 60 and the car body; and a resilient member (not shown) disposed in the case 72 for absorbing shock or vibration transmitted from the front wheel 51.

Figure 6:
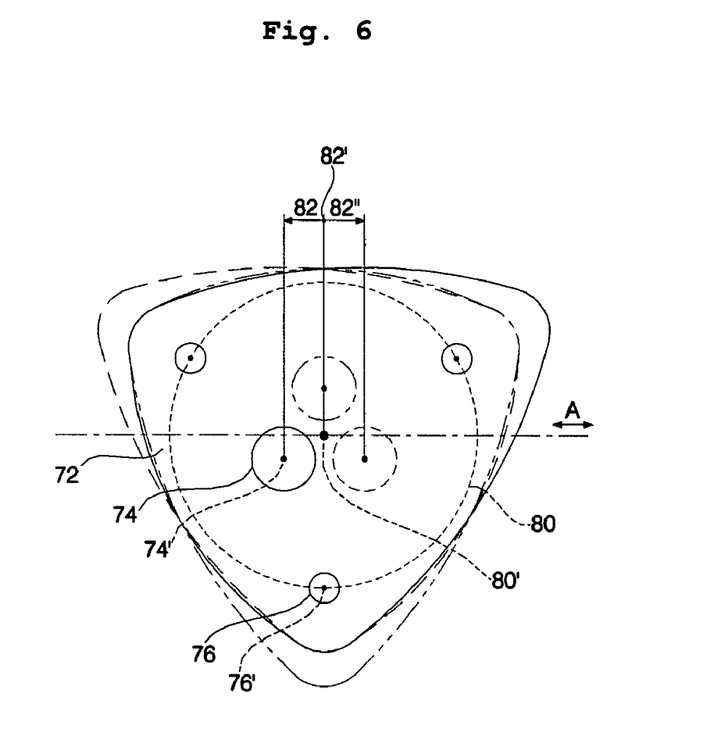
FIG. 6 is a plan view of the insulator according to the preferred embodiment of the present invention shown in FIG. 5.
Figure 7:
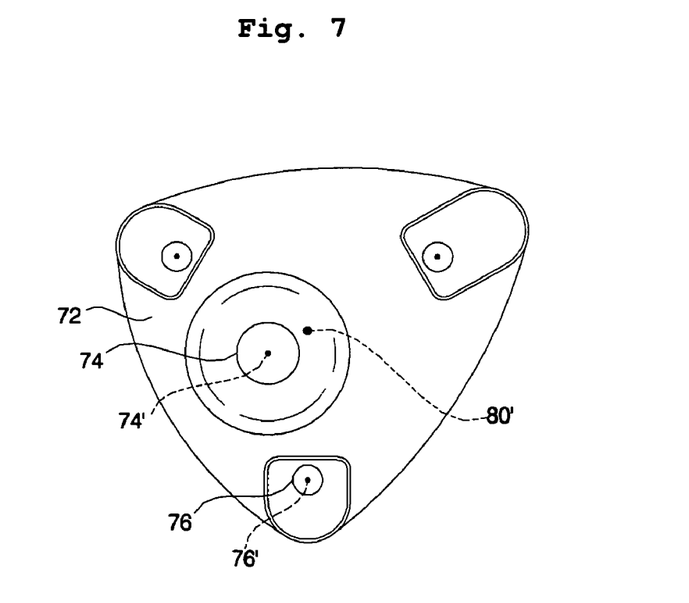
FIG. 7 is a rear view of the insulator according to the preferred embodiment of the present invention shown in FIG. 5.

The insulator 70 is fixedly connected to the strut 60 in a bolt-connection fashion. Specifically, the strut 60 is provided at the upper end thereof with a strut bolt, and the insulator 70 is provided with a strut hole 74 for allowing the strut bolt of the strut 60 to be inserted therethrough. On the strut bolt of the strut 60 inserted through the strut hole of the insulator 70 is securely fitted a strut nut, by which the insulator 70 is fixedly connected to the strut 60. The point where the insulator 70 is connected to the strut 60 is referred to as a strut point 74'.

Also, the insulator 70 is fixedly connected to the car body in a bolt-connection fashion. To this end, the insulator 70 is provided with a plurality of car body-connection bolts 76, which are protruded toward the car body so that the insulator 70 can be fixedly connected to the car body by means of the car body-connection bolts 76. The point where the insulator 70 is connected to the car body, i.e., the center of each car body-connection bolt 76 is referred to as a car body point 76'. Also, the point where each car body-connection bolt 76 is connected to the car body is referred to as a car body bolt point.

The several car body points 76' are uniformly spaced apart from each other on an imaginary circle formable in the inside of the insulator 70. The strut point 74' is positioned in the inside of the imaginary circle 80 while being eccentric from the center of a circle formed by the car body points 76', i.e., the center 80' of the imaginary circle 80.

When the insulator 70 is rotated about the center 80' of the imaginary circle 80 as shown in FIG. 6, the relative positions of the car body points 76' are changed in the circumferential direction of the imaginary circle 80, although the position of the insulator 70 itself is not substantially changed. In other words, when the insulator 70 is rotated about the center 80' of the imaginary circle 80 by the angle between the car body-connection bolts 76 while the insulator 70 is opposite to the car body so that the car body points 76' exactly correspond to the car body bolt points, respectively, the insulator 70 is opposite to the car body while the car body points 76' exactly correspond to the car body bolt points, respectively.

Figure 8:
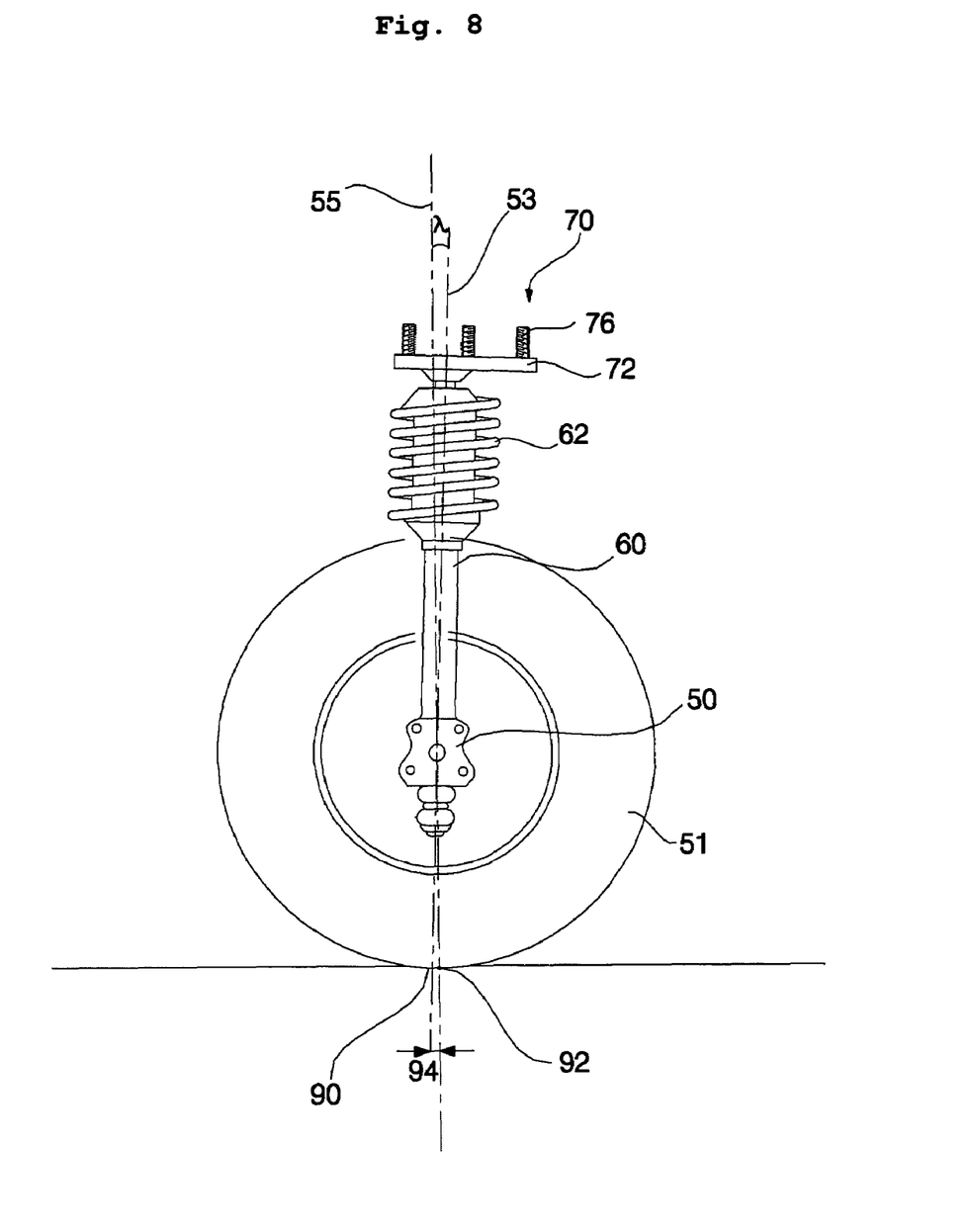
FIG. 8 is a view illustrating the operation of the suspension and its insulator according to the preferred embodiment of the present invention shown in FIG. 5.
Figure 9:
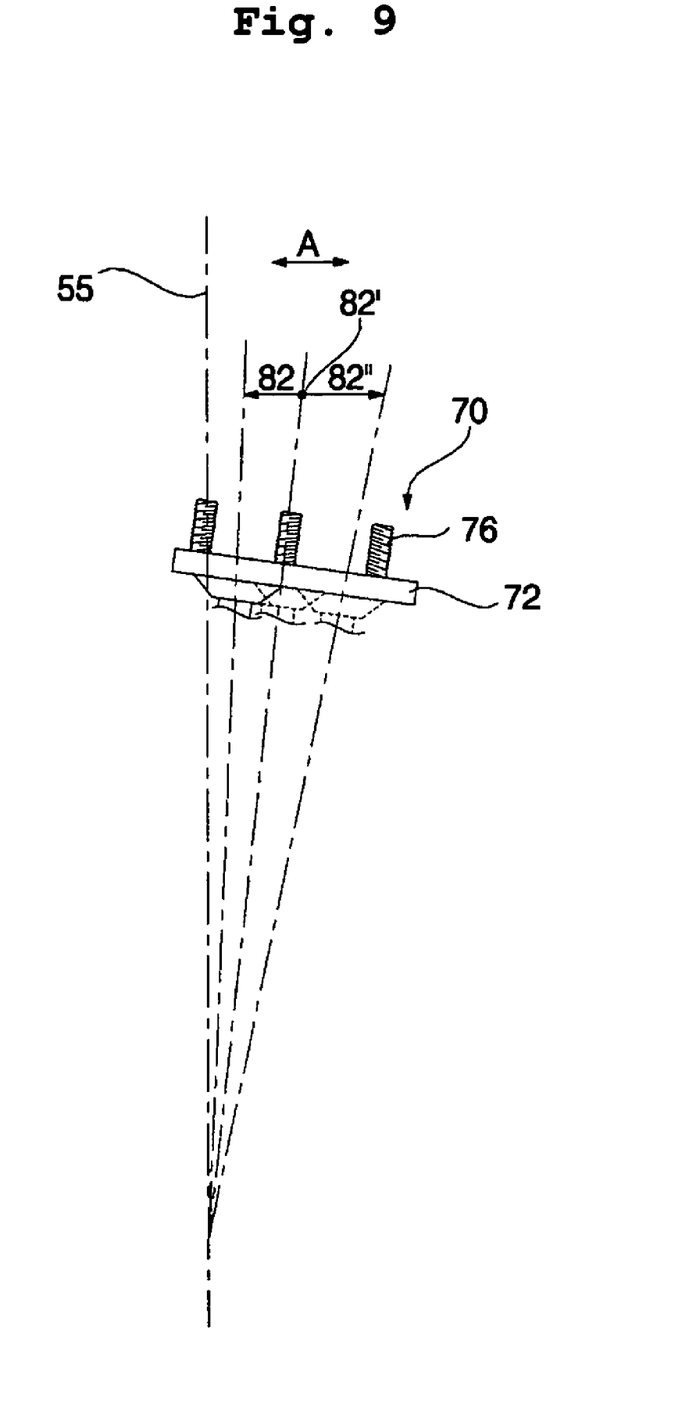
FIG. 9 is a view illustrating the operation of the insulator of the suspension according to the preferred embodiment of the present invention shown in FIG. 5.

As the insulator 70 is rotated about the center 80' of the imaginary circle 80, as shown in FIGS. 8 and 9, the relative positions 82, 82' and 82" of the strut point 74' from the center 80' of the imaginary circle 80 are changed in the front and rear direction of the car body, i.e., in the direction indicated by arrow A. At this time, the strut 60 is rotated forward and backward about the steering knuckle 50 along with the strut point 74'. As a result, the caster angle λ is changed.

It is necessary that the length of the strut 60 be changed depending on a forward/backward tilt angle of the strut 60 from the vertical line 55 perpendicular to the road surface, i.e., an angle of the strut 60 tilted in the front and rear direction of the car body, i.e., in the direction indicated by arrow A, from the vertical line 55 perpendicular to the road surface. Since the caster angle λ is usually changed between 1 degree and 10 degrees, however, the change in length of the strut 60 is sufficiently accommodated by means of the shock absorber 64.

Since the insulator 70 is rotated about the center 80' of the imaginary circle 80 by the angle between the car body points 76', the movable distance of the strut point 74' about the center 80' of the imaginary circle 80 in the front and rear direction 9f the car body, i.e., in the direction indicated by arrow A, is determined on the basis of the angle between the car body points 76'. Consequently, the caster angle λ can be changed more minutely when the car body points 76' are provided in large numbers. When the number of the car body points 76' is increased, however, it is necessary to provide the insulator with a large number of car body-connection bolts 76 accordingly. Furthermore, connection of the car body-connection bolts 76 is complicated. Therefore, the number of the car body-connection bolts 76 is preferably three so that the car body-connection bolts 76 are spaced apart from each other by 120 degrees.

The operation of the suspension and its insulator with the above-stated construction according to the present invention will be described below in detail.

When the strut 60 is connected to the steering knuckle 50 by means of the king pin 52, and is then connected to the car body by means of the insulator 70, the strut 60 is tilted, along with the king pin 52, predetermined degrees forward or backward, i.e., in the direction indicated by arrow A, from the vertical line 55 perpendicular to a road surface. As a result, the caster angle $\lambda$ is obtained.

Referring to the connection of the insulator 70 to the car body, the insulator 70 is disposed opposite to the car body such that the car body points 76' exactly correspond to the car body bolt points, respectively. As shown in FIGS. 6, 8 and 9, the insulator 70 is rotated about the center 80' of the imaginary circle 80 in one direction by the angle between the car body points 76'. As a result, the relative positions 82, 82' and 82" of the strut point 74' about the center 80' of the imaginary circle 80 are determined in the front and rear direction of the car body, i.e., in the direction indicated by arrow A. When the relative positions 82, 82' and 82" of the strut point 74' about the center 80' of the imaginary circle 80 are determined in the front and rear direction of the car body, i.e., in the direction indicated by arrow A, the tilt angle of the strut 60 and the caster angle $\lambda$ are also determined.

As described above, the relative positions 82, 82' and 82" of the strut point 74' about the center 80' of the imaginary circle 80 can be adjusted in the front and rear direction of the car body, i.e., in the direction indicated by arrow A, when the insulator 70 is connected to the car body. Consequently, the caster angle $\lambda$ can be optimally obtained according to the characteristics of each vehicle irrespective of kinds of vehicles without changing the structure of the suspension.

Also, the caster angle $\lambda$ may be adjusted depending on whether a power steering system to increase the steering force is included or not without changing the structure of the suspension in the case of the same kind of vehicle.

As shown in FIG. 8, the point where the extension of the center line 53 of the king pin 52 crosses the road surface is referred to as a caster point 90, and the distance between the caster point 90 and the center 92 of the road surface where the front wheel 51 contacts is referred to as a trail 94. As the caster angle $\lambda$ is increased, the trail 94 is also increased. As a result, a restoring force for directing the front wheel 51 in the traveling direction of the vehicle is increased.

Consequently, a relatively small caster angle $\lambda$ is provided so that the restoring force determined on the basis of the caster angle $\lambda$ is decreased in the case of a vehicle having no power steering system, i.e., a manual steering vehicle. As the caster angle $\lambda$ is small, a driver of the vehicle can easily control a steering wheel.

In the case of a power steering vehicle, on the other hand, it is unnecessary to give consideration to the steering force of the driver. Consequently, the caster angle $\lambda$ is increased such that the caster angle $\lambda$ of the power steering vehicle is greater than that of the manual steering vehicle. As a result, the restoring force is increased.

As apparent from the above description, the several car body points 76' are uniformly spaced apart from each other on the imaginary circle 80, and the strut point 74' is eccentric from the center 80' of the imaginary circle 80. As the insulator 70 is rotated about the center 80' of the imaginary circle 80, the relative positions of the strut point 74' from the center 80' of the imaginary circle 80 are adjusted in the front and rear direction of the car body, i.e., in the direction indicated by arrow A. Consequently, the present invention has the effect of easily changing the caster angle $\lambda$. Furthermore, it is not necessary that the structure of the suspension be altered to change the caster angle $\lambda$ according to kinds of vehicles or depending on whether a power steering system is included or not. Consequently, the present invention has the effect of improving compatibility.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An insulator for a suspension, comprising:
    a strut hole;
    car body connector receiving holes configured to receive corresponding car body connectors, the car body connector receiving holes and strut hole both being provided in a same surface of the insulator; and
    a strut point provided in the strut hole and configured to be connected to a strut,
    wherein the strut hole and strut point are eccentric to a center of an imaginary circle having a circumference which passes through centers of the car body connector receiving holes such that the strut point can be moved about the center of the imaginary circle in front and rear directions of the car body when the insulator is rotated about the center of the imaginary circle.

2. The insulator as set forth in claim 1, wherein the strut point is positioned within the imaginary circle.

3. The insulator as set forth in claim 2, wherein the car body connector receiving holes are uniformly spaced from each other on the imaginary circle.

4. The insulator as set forth in claim 3, wherein the number of the car body connector receiving holes is three so that the car body connector receiving holes are spaced apart from each other by 120 degrees.

5. The insulator as set forth in claim 1, wherein the car body connector receiving holes are uniformly spaced from each other on the imaginary circle.

6. The insulator as set forth in claim 5, wherein the number of the car body connector receiving holes is three so that the car body connector receiving holes are spaced apart from each other by 120 degrees.

7. A suspension comprising:
    a strut disposed between a car body and a steering knuckle such that the strut can be tilted forward or backward from a vertical line perpendicular to a road surface to obtain a caster angle;
    an insulator connected to the strut by a strut point and connected to the car body by a plurality of car body connectors; and
    car body connector receiving holes configured to receive corresponding car body connectors, the car body connector receiving holes and strut hole both being provided in a same surface of the insulator,
    wherein the strut hole and strut point are eccentric to a center of an imaginary circle having a circumference which passes through centers of the car body connector receiving holes such that the strut point can be moved about the center of the imaginary circle in front and rear directions of the car body when the insulator is rotated about the center of the imaginary circle.

8. The suspension as set forth in claim 7, wherein the strut point is positioned within the imaginary circle.

9. The suspension as set forth in claim 8, wherein the car body connector receiving holes are uniformly spaced apart from each other on the imaginary circle.

10. The suspension as set forth in claim 9, wherein the number of the car body connector receiving holes is three so that the car body connector receiving holes are spaced apart from each other by 120 degrees.

11. The suspension as set forth in claim 7, wherein the car body connector receiving holes are uniformly spaced from each other on the imaginary circle.

12. The suspension as set forth in claim 11, wherein the number of the car body connector receiving holes is three so that the car body connector receiving holes are spaced apart from each other by 120 degrees.

* * * * *